Figure 1:
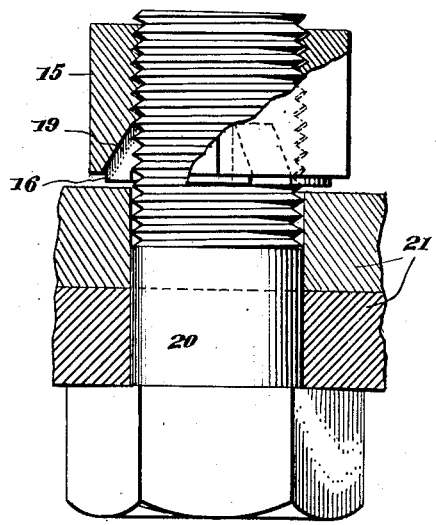

Sept. 20, 1938.    A. STOLL    2,130,827

LOCK NUT

Filed Jan. 14, 1937

Inventor
ALBERT STOLL

By E. F. Salter
Attorney

Patented Sept. 20, 1938

2,130,827

UNITED STATES PATENT OFFICE 2,130,827

LOCK NUT

Albert Stoll, Detroit, Mich., assignor to Clare L. Brackett, Detroit, Mich.

Application January 14, 1937, Serial No. 120,587

4 Claims. (Cl. 151—21)

The present invention relates generally to lock nuts and more particularly to a nut which, when forcibly tightened against a part to be clamped, will be deformed to such an extent as to function as a lock nut whereby the same is caused to effectively grip and assume a self-locking relation to a bolt or cooperating member upon which it is threaded, while at the same time preserving its adaptability to subsequent removal in the usual manner.

More especially, it is the purpose of the present invention to provide a nut adapted for use in assembly with a standard screw bolt and which is so formed as to provide means which, when the nut is subjected to tightening as by a wrench in the usual manner, are deformed to cause a locking engagement of the threads of the nut with those of the bolt, which locking engagement is effective to minimize, and in many instances entirely eliminate all danger of self-loosening of the assembly while at the same time preserving the nut in such condition that it may be removed in the usual manner without mutilation or destruction of the cooperating threads, making possible the repeated usage of the nut as well as the bolt.

The desirable results of this invention have, in the past, been recognized by those skilled in the art, but, however practical the prior art structures, their production has heretofore been prohibitive not only from a standpoint of cost of manufacture but also due to the necessary sacrifice of a certain degree of the inherent strength and durability and the appearance of the nut in its final form.

It is, therefore, an object of this invention to provide a nut similar in size, shape, strength and durability to that of a conventional nut and which provides a self-locking action upon being advanced to its applied fastening position.

A further object is to provide a nut which may be constructed by the usual blank forming and internal threading operations and is also provided with self-locking means without appreciably increasing the cost of manufacture.

Another object is to provide a nut which is complete in itself and is provided, during the forming thereof, with integral means designed to be deformed to cause a self-locking action of the nut in fastening position.

A still further object is to provide a nut having integral means adapted to be deformed to effect a self-locking action of the nut with its cooperating member, and other means adapted to retain a lubricant to prevent seizure or "freezing" of the nut to its cooperating member, thus insuring easy and ready disengagement without mutilation or destruction of either member.

Other objects and advantages will be apparent during the course of the following description.

Figure 2:
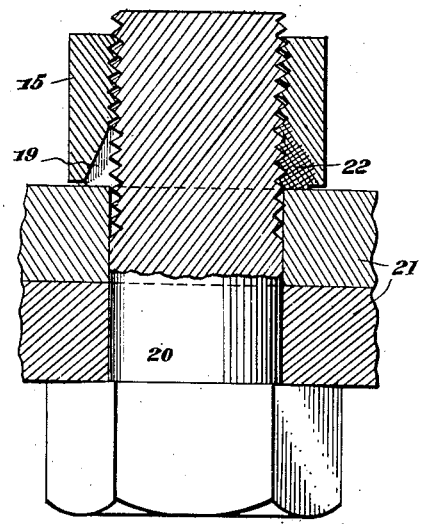
Figure 3:
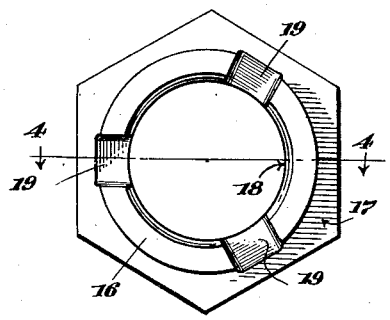
Figure 5:
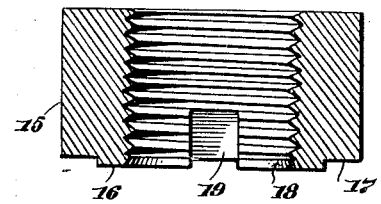
Figure 4:
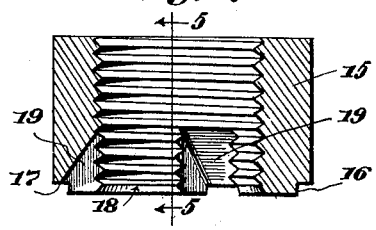
Figure 6:
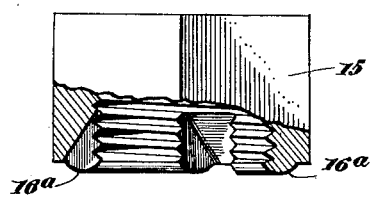
Figure 4A:
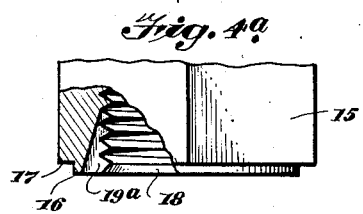

In the accompanying drawing forming a part of this specification and in which like numerals are used to designate like parts throughout the same, Figure 1 is a view of an assembly with the nut shown partly in section and partly in elevation, and disposed on the bolt just prior to being advanced to fastening position, Figure 2 is a sectional view of the nut tightened and in thread locking relation to the bolt, Figure 3 is a bottom plan view of the nut, Figure 4 is a diametrical sectional view taken on line 4—4 of Figure 3, Figure 4a is a view of the nut, partly in section, showing an alternate construction of the deformable, self-locking means, Figure 5 is a sectional view of the nut taken on line 5—5 of Figure 4 showing in elevation the specific formation of the integral, deformable, self-locking means, and Figure 6 is a view partly in section, illustrating a nut made in accordance with the invention having a modified integral, deformable, self-locking means.

Referring now to these figures and particularly to Figures 3, 4 and 5, the nut 15 is shown as formed with an annular rib 16 axially projecting from its inner face or end 17 and immediately surrounding its threaded bore 18, with the outer peripheral edge thereof substantially spaced from the outer periphery of the nut irrespective of the particular external shape or contour of the latter.

It is further proposed that rib 16 be an integral part of the body of nut 15 and function as a self-locking means in conjunction with axially disposed recesses 19 arranged at spaced points around its threaded bore 18, the said recesses extending for but a portion of the axial dimension of the nut. These recesses 19, as plainly seen by a comparison of Figures 3 and 4, open into the bore 18 throughout their full lengths from the inner free end or face of the nut, and preferably have their base-walls inclined axially of the bore 18 so that they gradually deepen toward the work engaging face of the nut. Thus, while the recesses 19 extend but partially through the side walls of the nut 15 even at the deepest points thereof, such recesses are somewhat deeper at the work engaging face of the nut than the width of the rib 16 and serve to completely intersect the rib at circumferentially spaced points of the latter.

By virtue of this recess formation, the inner end portion of the nut adjacent its bore 18 is suitably weakened so that when the nut is threaded on a standard screw bolt 20 with the rib 16 innermost and in contact with the work 21 to be clamped, tightening of the nut firmly against the adjacent face of the work serves to compress or deform the rib 16 to an extent to cause a compression, collapse or inward flow of the metal of the nut 15 in the region of the weakened inner end portion as indicated at 22 in Figure 2, whereby the threads of the nut throughout this region are forced into firm gripping or locking engagement with the threads of the bolt. This also places an axial stress on the cooperating threads to further aid in securing the nut against self-loosening.

An alternate construction involves the use of recesses 19a, Figure 4a, which only partly intersect the rib which, in many instances, sufficiently weakens the rib for the desired deformation thereof, and also has the advantage of effectively sealing the screw threads from the outside.

In the foregoing operation it is to be noted two things are outstanding:

First, the fact that the deeper ends of the recesses 19 or 19a completely or partially intersect the rib 16 to weaken these areas of the nut, admits of a ready deformation of the rib and the adjacent metal of the nut to effect the desired compression and free inward flow of the metal of the nut in such areas to provide a self-locking engagement of the nut and bolt threads in a degree to prevent accidental unscrewing or self-loosening of the nut and assuring against loss of the nut should a reduction of tension between the clamped members take place.

Second, the proposed structure provides a thread lock resulting mainly from a resilient gripping action of the cooperating threads, insuring easy subsequent manual removal of the nut without mutilating or otherwise injuring the threads of either element whereby both the nut and the bolt may be re-used in the same or a similar assembly.

The inner face or rib 16 of the nut is weakened by the recesses 19 or 19a which completely or partially intersect the face 16 of the nut. In this connection, however, it should be noted that the recesses 19 or 19a do not extend to or intersect the outer peripheral wall of the nut, which remains unbroken. As a result, any compression or collapse of the metal of the nut is exerted inwardly against the threads of the bolt to create an intensive gripping and locking effect.

As seen in the various figures of the drawing previously mentioned, the rig 16 may be flat. On the other hand, it may have the corners of rounded form as shown at 16a in Figure 6 where the nut is, in other respects, the same as specified in the foregoing description. It is obvious that this form as well as other possible forms of deformable means which do not vary the stated functions and results, hereinbefore stated, lend themselves readily to function in conjunction with weakening recesses or the like. Not only is this true, but it is also obvious no complications of the usual blank forming operations are necessitated in the manufacture of the nut with the exception of the recess forming operation, nor is the presence of the recesses 19 any detriment in the necessary subsequent threading operation.

Owing to the fact that the recesses 19 or 19a are internally arranged and do not extend through the wall of the nut, rust formation is prevented, and if a lubricant is provided in the angularly and inwardly located recesses, a safe assurance is provided to enable the ready and convenient disengagement of the nut at will. It will also be apparent that the recesses 19 or 19a may be packed or filled with a graphitic grease or similar lubricant to prevent seizure or "freezing" of the nut to the bolt when the bolt and nut are employed in connection with highly heated parts such, for example, as manifold fastenings of internal combustion engines.

While I have shown and described the preferred embodiments of my invention, it is to be understood that various changes in the size, shape and arrangement of parts may be resorted to without departing from the spirit of my invention or the scope of the subjoined claims.

Having thus described the invention, what is claimed is:

1. A lock nut for cooperation with a standard screw bolt, said nut having a threaded bore and an internal, axially tapering recess in said threaded bore in communication with the threads of the bolt and the work-engaging end of the nut, said nut also having an annular rib at said work-engaging end closely surrounding the said bore and of a width less than the thickness of the wall of the nut, the deeper end of said recess intersecting the said rib whereby on tightening of the nut against an adjacent work surface said rib may readily collapse in the region of said recess and inwardly into locking engagement with the threads of the bolt.

2. A lock nut for cooperation with a standard screw bolt, said nut having a threaded bore and an axially projecting annular rib at its work-engaging face closely surrounding the respective end of the bore and of a width less than the thickness of the wall of the nut, said nut also having axially tapering recesses in its inner threaded surface adjacent to said work-engaging face, the deeper ends of said recesses intersecting the said rib to weaken said rib at points in communication with the threads of the bolt, whereby on tightening of the nut against an adjacent work surface deformation of said rib inwardly into locking engagement with the threads of the bolt is insured.

3. A lock nut for a standard screw bolt, said nut having a threaded bore and an axially projecting annular rib at its work-engaging face closely surrounding the said bore, said nut also having recesses of lengthwise tapering form in and at spaced points around its inner threaded bore and adjacent its work-engaging face, the recesses gradually deepening to and opening through the said rib and being at their deepest ends of a depth greater than the width of the rib and less than the thickness of the wall of the nut to weaken said rib at points in communication with the threads of the bolt without weakening the wall of the nut and, on tightening of the nut, insuring collapse of said rib inwardly into locking engagement with the threads of the bolt.

4. A lock nut for cooperation with a screw bolt, said nut having a threaded bore and an axially projecting annular rib at its work engaging face closely surrounding the end of the bore, said nut also having axially tapering recesses in its inner threaded surface adjacent said work engaging face, the deeper ends of said recesses intersecting a portion of said rib to weaken said rib at points in communication with the threads of the bolt, whereby on tightening of the nut against an adjacent work surface deformation of said rib inwardly into locking engagement with the threads of the bolt is insured, said recesses also being adapted to serve as means for retaining a lubricant in direct contact with the threads of the bolt.

ALBERT STOLL.